(12) United States Patent
Huber et al.

(10) Patent No.: US 7,576,039 B2
(45) Date of Patent: Aug. 18, 2009

(54) ADDITIVE FOR DRILLING FLUIDS

(75) Inventors: Johann Huber, Traunwalchen (DE); Johann Plank, Trostberg (DE); Jürgen Heidlas, Trostberg (DE); Gregor Keilhofer, Tacherting (DE); Peter Lange, Obing (DE)

(73) Assignee: BASF Construction Polymers GmbH, Trostberg (DE)

( * ) Notice: Subject to any disclaimer, the term of this patent is extended or adjusted under 35 U.S.C. 154(b) by 671 days.

(21) Appl. No.: 11/316,325

(22) Filed: Dec. 22, 2005

(65) Prior Publication Data

US 2006/0166833 A1     Jul. 27, 2006

(51) Int. Cl.
*C09K 8/035* (2006.01)
*C09K 8/12* (2006.01)
*E21B 43/22* (2006.01)

(52) U.S. Cl. .............. 507/126; 507/108; 507/120; 507/121; 507/122; 507/127; 507/128; 507/129; 507/134; 507/135

(58) Field of Classification Search ............ None
See application file for complete search history.

(56) References Cited

U.S. PATENT DOCUMENTS

| | | | | |
|---|---|---|---|---|
| 4,427,449 A | * | 1/1984 | Zdybak | 106/277 |
| 4,609,695 A | * | 9/1986 | Cogliano | 524/59 |
| 4,743,383 A | * | 5/1988 | Stewart et al. | 507/110 |
| 5,024,702 A | * | 6/1991 | Mazuch et al. | 106/277 |
| 5,981,446 A | * | 11/1999 | Qiu et al. | 507/209 |
| 6,818,594 B1 | * | 11/2004 | Freeman et al. | 507/101 |
| 7,199,083 B2 | * | 4/2007 | Zevallos | 507/102 |
| 7,384,892 B2 | * | 6/2008 | Melbouci et al. | 507/104 |

* cited by examiner

*Primary Examiner*—James Seidleck
*Assistant Examiner*—John J Figueroa
(74) *Attorney, Agent, or Firm*—Fulbright & Jaworski L.L.

(57) ABSTRACT

Subject matter of the present invention is a drilling fluid additive based on sulfonated asphalt, which comprises a water soluble and anionic polymer component in quantities of 0.1 to 20 wt. %, with respect to the total additive in addition to the asphalt component. With this additive the water solubility of sulfonated asphalt can be markedly increased. This additive, whose polymer component is thermally highly stable, is utilized primarily in water- and/or oil-based drilling fluids and in particular in the exploration of subterranean petroleum and natural gas deposits. Typical polymer components to consider are representatives of polycondensation products, such as phenol resins, ketone resins and sulfonated naphthalene, acetone and amino plasticizer resins (for example urea and melamine resins).

19 Claims, No Drawings

ADDITIVE FOR DRILLING FLUIDS

This application claims priority from German Patent Application No: 10 2005 003 555.8 filed Jan. 26, 2005, herein incorporated by reference in its entirety.

Subject matter of the present invention is a drilling fluid additive based on sulfonated asphalt.

Drilling fluids are complex, most often liquid systems, which are most often circulated, during the drilling of a wellbore into or through subterranean formations and thereby supporting the drilling process. A drilling fluid has a number of tasks, which comprise transporting the cuttings out of the borehole, simultaneously cooling and lubricating the drill bit, stabilizing the borehole wall or also compensating the hydrostatic pressure exerted by the formation. Due to the large number of tasks, specific additives have been developed for drilling fluids, in order to meet the specific requirements of the particular well. Based on the so-called continuous, thus external phase, drilling fluids can be divided into water- or oil-based drilling fluid systems.

Sulfonated asphalt is predominantly utilized for water-based drilling fluids but also for those based on oil (see H. C. H. Darley and G. R. Gray, Composition and Properties of Drilling and Completion Fluids, Gulf Publishing Company, Fifth Edition, p. 600). Apart from reduced filtrate loss and improved filter cake properties, good lubrication of the drill bit and decreased formation damage are important features assigned to sulfonated asphalt as drilling fluid additive. Formation damage can be understood as clogging and/or coating of the formation channels and pores resulting in reduced permeability or productivity. In particular also the property of the so-called "clay inhibition" by the sulfonated asphalt in the case of water-based drilling fluids, is of great interest. If swellable clays are not inhibited, i.e. their swelling capacity suppressed, undesirable water absorption and swelling of the clay occurs, which as a consequence can lead to serious technical problems expressed especially in the instability of the borehole or may even result in a stuck pipe, which ultimately can lead to abandoning the well.

The mechanism of action of sulfonated asphalt as a drilling fluid additive, and therein as a clay inhibitor, is currently explained that the electronegative sulfonated macromolecules and aggregates of the substantially water soluble or water dispersible fraction attach to the electropositive ends of the clay platelets. Thereby, a so-called neutralization barrier is created, which suppresses the absorption of water into the clay. In addition because the sulfonated asphalt is partially lipophilic, and therefore water repellent, the water influx into the clay is restricted by purely physical principles. The water insoluble fraction of the sulfonated asphalt is, regarding shell inhibition substantially of subordinate significance, such that this secondary effect is only to be seen in a mechanical blocking of the formation of pores.

These mechanisms of the water soluble and water insoluble fraction in clay inhibition are also useful to understand the sequence of events as they occur in filtrate control (function as so-called "fluid-loss additive"): In this case the filter cake of the drilling fluid at the bore hole wall, becomes less permeable which controls the flow of the drilling fluid into the surrounding formation.

In view of the different mechanisms of action it may become obvious that the ratio of water soluble to water insoluble fractions in the sulfonated asphalt is of special significance. This assumption is confirmed by the fact that a good clay inhibition is correlated with a high fraction of water soluble and easily water dispersible fraction.

Asphalt is a solid, black-brown to black bitumen fraction, which softens when heated and re-hardens upon cooling. Asphalt is not water soluble and difficult to disperse or emulsify in water.

Sulfonated asphalt can be made by reacting asphalt with sulfuric acid and sulfur trioxide. By neutralization with alkali hydroxides, such as NaOH or ammonia, the corresponding sulfonate salts result. Only a limited portion of the sulfonated product can be extracted by hot water extraction. However, the fraction thus obtained, which is more or less water soluble or water dispersible, is crucial for the quality and, in terms of utilizing technical application methods, is directly correlated with the desired properties of the sulfonated asphalt as a drilling fluid additive.

Within the scope of the present invention by "water soluble" or "water solubility", and relating to sulfonated asphalt based on its capacity to form aggregates/associates, is also understood its capability to be readily dispersible in water. According to this expanded definition, the water solubility can be analytically determined by simple means of hot water extraction, i.e., a Soxhlet extraction.

The diverse application profiles of the drilling fluids also imply great demands on the performance of sulfonated asphalt. The desired improvement of the solubility of sulfonated asphalt in water can often only be insufficiently controlled by the appropriate selection of the raw materials, i.e., the asphalt as well as by the chemical sulfonization process which is performed in costly equipment. These technical restrictions are also the main reason for water soluble sulfonated asphalts not having been available on the market until now in sufficiently good quality and in relatively large quantities.

However, since the water solubility of sulfonated asphalt represents the most important quality feature for its application in drilling fluids, there is still considerable economic interest in improving by simple means the water solubility of the sulfonated asphalt The present invention addresses the problem of providing a drilling fluid additive based on sulfonated asphalt. It focuses on improving the water solubility of the sulfonated asphalt by technically simple and efficient means. In addition, an enhanced water solubility results in a better clay inhibition at the same dosage and/or reducing the required quantity of sulfonated asphalt which improves the overall cost-efficiency for its use.

This problem was resolved by the design of a drilling fluid additive, which contains, in addition to the asphalt component, a water soluble and anionic polymer component in quantities of 0.1 to 20 percent by weight relative to the total additive, as well as a drilling fluid comprising sulfonated asphalt and this anionic polymer component.

In addition to resolving the defined problem, namely to improve significantly the water solubility of sulfonated asphalt, it was unexpectedly found, that through the introduction of a water soluble and an anionic polymer component, which is essential to the invention, the proportion of water insoluble asphalt proportions, which otherwise are conventionally contained in water-based drilling fluids, can be markedly reduced. In other words, the proportion of the water soluble fraction is increased by introducing the polymer component. The fact that the lipophilic proportion of the sulfonated asphalt, which conventionally floats on the surface of an aqueous medium, can largely be completely solubilized by the polymer component, was particularly unanticipated. This is all the more surprising since the polymer component comprised in the fluid according to the invention does not exhibit an especially strong surfactant effect, which, as is known, is essentially based on an amphiphilic molecular structure.

With respect to the proportion of the two main components in the drilling fluid additive, it was found to be favorable if the proportion of the asphalt component is 80 to 99.9 wt. % and the proportion of the polymer component 0.1 to 20 wt. %; proportions of the polymer component between 1.0 and 18.0 wt. % are found to be very useful, and especially preferred are concentrations between 3.0 and 10.0 wt. % polymer content.

A further preferred aspect of the present invention can be seen therein that the polymer component exerts a solubility improving effect on the asphalt component, which is of advantage in particular for water-based media and which is also taken into consideration by the present invention. The improved water solubility of the asphalt component, which is typically between 60 and 80%, exceeds in the drilling fluid additive according to the invention well the limit of 80% and may be more than even 96%.

With respect to the water soluble and anionic polymer component, the claimed drilling fluid additive is not subject to any substantial restrictions to one particular chemistry. However, especially suitable have been found to be polymer products, such as for example lignosulfonates as well as sulfonated phenol, ketone, naphthalene, acetone and amino plasticizing resins (for example urea and melamine resins) and other water soluble polymers. The further listed water soluble polymers are included according to the present invention of a) monoethylenically unsaturated monomers having acid groups in acidic, partially or completely neutralized form from the series composed of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters and/or amides of said carboxylic acids as well as their mixtures and/or their anhydrides, and optionally b) further monomers copolymerizable with the monomers a), from the series composed of methacrylamide, methacrylonitrile, methallyl alcohol, hydroxyalkyl methacrylate, with alkyl being $C_1$ to $C_5$, hydroxyalkyl polyethyleneoxy and -propyleneoxy or -butyleneoxymethacrylate with alkyl being $C_1$ to $C_5$, vinyl ethers such as for example hydroxy and alkoxy polyethyleneoxy or -polypropyleneoxyvinylether as well as analog allyl ethers with up to 10 repeating units, N-vinylacetamide, N-vinyllactames, N-vinylpyrrolidone, N-vinylimidazole, silicon functional co-monomers, such as methacryloxyalkyltrialkoxy silanes, vinyltrialkoxy silanes and vinylmethyldialkoxy silanes with $C_1$ to $C_5$ alkyl or alkoxy groups as well as their derivatives and their mixtures.

As has been stated repeatedly, the polymer component in the drilling fluid additive according to the invention is effecting the significant increase of the water solubility of sulfonated asphalt. To some extent this may be based on a dispersing effect of the polymer, but it should not be restricted to a surfactant effect alone. "Sulfonated asphalt" does not represent a well defined product. This is due to the sulfonation process itself and the fact that the degree of sulfonation is difficult to characterize by analytical means. In addition to this, it has not been possible so far to increase its water solubility by technically simple means, just by adding an additional additive. Rather, the drilling fluid additive always had to be adjusted to the origin and consequently quality of the sulfonated asphalt, i.e., its degree of sulfonation. In contrast, the present drilling fluid additive according to the invention is distinguished thereby that the water solubility of the particular batch of sulfonated asphalt can be relatively simply and significantly increased by adding the described polymer component.

Depending on the particular use of the drilling fluid additive according to the invention, it may be appropriate if, in addition to the two main components, other additives like defoamers, stabilizers and/or viscosifiers are additionally comprised therein, and these should preferably in this case be comprised in quantities of up to 5.0 wt. %, each with respect to the total additive.

In order to improve the efficiency of logistics, the present invention provides making available the drilling fluid additive as a powder mixture, which preferably should have a moisture content of 0.5 to 20 wt. % and preferably of <10 wt. %, again with respect to the total additive.

Drilling fluid additives must frequently meet increased requirements with respect to temperature and pressure, which is the reason for such special additives to be referred to as "HTHP" ("High Temperature High Pressure") additives. Consequently, the present invention also considers additives, in which the added polymer component is thermally stable within a temperature range of from 100 up to 250° C.

Without being limited to a special field of application, the present invention, in addition to the additive itself, comprises also its uses, in particular in water- and/or oil-based drilling fluids. The exploration of subterraneous petroleum and natural gas is to be viewed as being preferred and the use in the field of offshore drilling is to be viewed as being especially preferred.

In addition to the drilling fluid additive, the present invention also claims a drilling fluid comprising sulfonated asphalt and an anionic polymer component, the latter preferably exerting a solubility-improving effect on the asphalt component; the drilling fluid can optionally contain further components.

As already outlined in conjunction with the co-claimed drilling fluid additive, the ionic polymer component can again be selected from the group of condensation polymers, such as lignosulfonates, sulfonated phenol, ketone, naphthalene, acetone and amino plasticizer resins (for example urea and melamine resins) and further water soluble polymers comprised of:

a) monoethylenically unsaturated monomers having acid groups in acidic, partially or completely neutralized form from the series composed of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters and/or amides of said carboxylic acids as well as their mixtures and/or their anhydrides, and optionally b) further monomers copolymerizable with the monomers a), from the series composed of methacrylamide, methacrylonitrile, methallyl alcohol, hydroxyalkyl methacrylate, with alkyl being $C_1$ to $C_5$, hydroxyalkyl polyethyleneoxy and -propyleneoxy or -butyleneoxymethacrylate with alkyl being $C_1$ to $C_5$, vinyl ethers such as for example hydroxy and alkoxy polyethyleneoxy or -polypropyleneoxyvinylether as well as analog allyl ethers with up to 10 repeating units, N-vinylacetamide, N-vinyllactames, N-vinylpyrrolidone, N-vinylimidazole, silicon functional co-monomers, such as methacryloxyalkyltrialkoxy silanes, vinyltrialkoxy silanes and vinylmethyldialkoxy silanes with $C_1$ to $C_5$ alkyl or alkoxy groups as well as their derivatives and their mixtures.

These drilling fluids are also preferably used in the exploration of subterranean petroleum and natural gas deposits and here in particular in the field of offshore drilling.

With the present invention a novel drilling fluid additive is provided whose sulfonated asphalt component, exhibits increased and stable water solubility, which is achieved by the addition of a water soluble and anionic polymer. However, these advantages can not only be exploited in the form of a premixed additive, but rather are also evident if sulfonated asphalt and representatives of the anionic polymer component are added separately to a drilling fluid.

The following examples are designed to demonstrate the advantages of the present invention.

EXAMPLES

Example 1

In the following test commercially available sulfonated asphalt without additional substances (Control (1)) and in combination with a sulfonated acetone resin as the water soluble and anionic polymer component (Invention Example (2)) were subjected to hot water Soxhlet extraction.

The sulfonated ketone resin was mixed in at a ratio of 5 wt. % to 95 wt. % of asphalt.

Both batches were extracted for 8 hours, whereupon for the control example a water solubility of 63.0% and for the example of the invention a water solubility of 92.9% was determined, although in this case a purely theoretical water soluble proportion of only 65% should have resulted with respect to the mixture (Invention Example).

Example 2

In this test series sulfonated asphalt, again without additional substance (Control) and in combination with the resin listed in Example 1 as the water soluble and anionic polymer (Invention Example), was subjected to dynamic ageing. In addition, the samples were subjected to heat treatment in a conventional clay/water-based drilling fluid as the test system first over a period of 16 hours at 250° F. The fluid was cooled to ambient temperature and again stirred for 5 minutes.

The abbreviations in the following Table indicate:
BHR: before hot roll
AHR: after hot roll
PV: plastic viscosity [cPoise]
YP: Yield Point [lbs/100 ft$^2$]
S.G.: Specific Gravity.

|  |  | S.G. after cooling | FANN Rheology | PV | YP | HTHP at 250° F. (appr. 121° C.) |
|---|---|---|---|---|---|---|
| Control 1) | BHR | 1.33 | 71-41-30-18-3-2 | 30 | 11 |  |
|  | AHR | 1.39 | 73-41-30-17-4-3 | 32 | 9 | 24 |
| Invention 2) | BHR | 1.33 | 75-42-29-18-6-4 | 33 | 12 |  |
|  | AHR | 1.40 | 75-41-29-17-5-3 | 34 | 7 | 10 |

Example 3

Clay Inhibition 5 g of the mixture (Invention Example) described in Example 1, in comparison to sulfonated asphalt without addition (Control), were each placed into 350 ml of a 25% sodium chloride solution (salt solution). Duranit® balls (commercially available packings of clay) were placed into 250 ml beakers and each covered with 150 ml of said salt solutions. After 15 minutes the Duranit balls were optically analyzed. In the control example the Duranit balls were nearly completely decomposed, whereas in the example of the invention the Duranit balls were only superficially degraded.

Example 4

5 g of a commercially available sulfonated asphalt without additional substances (Control) and a combination of sulfonated asphalt and a sulfonated melamine resin as the water soluble and anionic component (95% pbw asphalt and 5 pbw polymer; Invention Example) were dispersed in 350 ml of tap water. In the next step into each of two 250 ml beakers 30 g OCMA clay were placed and subsequently covered with 150 ml of the described dispersions. The dispersions were allowed to stand for 24 hours at ambient temperature. The rheology of the two dispersions was subsequently determined with the aid of a FANN 35 rotational viscometer.

| Sample | Dosage [g] | FANN 35 Readings @600-300-200-100-6-3 rpm |
|---|---|---|
| Tap water | — | 55-42-38-25-12-10 |
| Invention | 5 | 18-12-10-5-2-2 |
| Control | 5 | 32-24-20-13-11-9 |

As the viscometer results show, in the example of the invention the rheology could be markedly reduced with the aid of the polymer addition according to the invention compared to the control addition, which, as the additional substance, contained exclusively sulfonated asphalt.

This demonstrates the significantly improved clay inhibition as was effected by the formulation according to the invention.

It is claimed:

1. A drilling fluid additive comprising sulfonated asphalt and water soluble and anionic polymer component in an amount of from 0.1 to 20 wt. % with respect to the total weight of the additive wherein the anionic polymer component comprises a polycondensation product of a lignosulfonate, sulfonated phenol, ketone, naphthalene, acetone and an amino plasticizer resin and a further water soluble polymer comprising:
   a) at least one monoethylenically unsaturated monomer having acid groups in acidic, partially or completely neutralized form selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters or amides of said carboxylic acids, mixtures thereof or anhydrides thereof.

2. The additive as claimed in claim 1, comprising from 99.9 to 80 wt. % of the asphalt component and from 0.1 to 20 wt. % of the polymer component.

3. The additive of claim 1, comprising 1.0 to 15.0 wt. % of the polymer component.

4. The additive of claim 1, comprising from 3.0 to 10.0 wt. % of the polymer component.

5. The additive as claimed in claim 1, further comprising at least one of a defoamer, a stabilizer or texturing agent.

6. The additive of claim 5, wherein said at least one defoamer, stabilizer or texturing agent is present in an amount of up to 5 wt. % with respect to the total weight of the additive.

7. The additive as claimed in claim 1, in the form of a powder mixture preferably with a moisture content of 0.5 to 20 wt. % and preferably of <10 wt. % with respect to the total additive.

8. The additive of claim 7, wherein the moisture content of the powder is from 0.5 too 20 wt. %.

9. The additive of claim 7, wherein the powder has a moisture content of Li0 wt. %.

10. The additive as claimed in claim 1, wherein the polymer component is preferably thermally stable within a temperature range of from 100 up to 250EC.

11. A drilling fluid comprising sulfonated asphalt and an anionic polymer component, wherein the anionic polymer component is a lignosulfonate, a sulfonated phenol, a ketone, naphthalene, acetone, and an amino plasticizer resin and further water soluble polymers comprising:
   a) at least one monoethylenically unsaturated monomer having acid groups in acidic, partially or completely neutralized form selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters or amides of said carboxylic acids, mixtures thereof and anhydrides thereof.

12. A drilling fluid additive comprising sulfonated asphalt and water soluble and anionic polymer component in an amount of from 0.1 to 20 wt. % with respect to the total weight of the additive wherein the anionic polymer component comprises a polycondensation product of a lignosulfonate, sulfonated phenol, ketone, naphthalene, acetone and an amino plasticizer resin and a further water soluble polymer comprising:
   a) at least one monoethylenically unsaturated monomer having acid groups in acidic, partially or completely neutralized form selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters or amides of said carboxylic acids, mixtures thereof or anhydrides thereof, and
   b) a further monomer copolymerized with the monomers a) selected from the group consisting of methacrylamide, methacrylonitrile, methallyl alcohol, hydroxyalkyl methacrylate, with alkyl being $C_1$ to $C_5$, hydroxyalkyl polyethyleneoxy and -propyleneoxy or -butyleneoxymethacrylate with alkyl being $C_1$ to $C_5$, a vinyl ether, a silicon functional co-monomer, derivatives thereof or mixtures thereof.

13. The drilling fluid additive according to claim 12, wherein the silicon functional co-monomer is a methacryloxyalkyltrialkoxy silane, a vinyltrialkoxy silane or vinylmethyldialkoxy silanes having $C_1$ to $C_5$ alkyl or alkoxy groups.

14. The drilling fluid additive according to claim 12, wherein the vinyl ether is a hydroxy or alkoxy polyethyleneoxy or polypropyleneoxyvinylether or an analog allyl ether thereof, with up to 10 repeating units, N-vinylacetamide, an N-vinyllactame, N-vinylpyrrolidone, or N-vinylimidazole.

15. The drilling fluid additive according to claim 12, wherein the silicon functional co-monomer is a methacryloxyalkyltrialkoxy silane, a vinyltrialkoxy silane or vinylmethyldialkoxy silanes having $C_1$ to $C_5$ alkyl or alkoxy groups, and wherein the vinyl ether is a hydroxy or alkoxy polyethyleneoxy or polypropyleneoxyvinylether or an analog allyl ether thereof, with up to 10 repeating units, N-vinylacetamide, an N-vinyllactame, N-vinylpyrrolidone, or N-vinylimidazole.

16. A drilling fluid comprising sulfonated asphalt and an anionic polymer component, wherein the anionic polymer component is a lignosulfonate, a sulfonated phenol, a ketone, naphthalene, acetone, and an amino plasticizer resin and further water soluble polymers comprising:
   a) at least one monoethylenically unsaturated monomer having acid groups in acidic, partially or completely neutralized form selected from the group consisting of acrylic acid, methacrylic acid, 2-ethylacrylic acid, 2-propylacrylic acid, vinylacetic acid, crotonic and isocrotonic acid, maleic acid, fumaric acid, itaconic acid, citraconic acid, vinylsulfonic acid, methallylsulfonic acid, 2-acrylamido-2-methylpropylsulfonic acid, 4-vinylphenylsulfonic acid, vinylphosphonic acid, (semi) esters or amides of said carboxylic acids, mixtures thereof and anhydrides thereof; and
   b) a further monomer copolymerized with the monomers a) selected from the group consisting of methacrylamide, methacrylonitrile, methallyl alcohol, hydroxyalkyl methacrylate, with alkyl being $C_1$ to $C_5$, hydroxyalkyl polyethyleneoxy and -propyleneoxy or -butyleneoxymethacrylate with alkyl being $C_1$ to $C_5$, a vinyl ether, a silicon functional co-monomer, derivatives thereof or mixtures thereof.

17. The drilling fluid additive according to claim 16, wherein the silicon functional co-monomer is a methacryloxyalkyltrialkoxy silane, a vinyltrialkoxy silane or vinylmethyldialkoxy silanes having $C_1$ to $C_5$ alkyl or alkoxy groups.

18. The drilling fluid additive according to claim 16, wherein the vinyl ether is a hydroxy or alkoxy polyethyleneoxy or polypropyleneoxyvinylether or an analog allyl ether thereof, with up to 10 repeating units, N-vinylacetamide, an N-vinyllactame, N-vinylpyrrolidone, or N-vinylimidazole.

19. The drilling fluid additive according to claim 16, wherein the silicon functional co-monomer is a methacryloxyalkyltrialkoxy silane, a vinyltrialkoxy silane or vinylmethyldialkoxy silanes having $C_1$ to $C_5$ alkyl or alkoxy groups, and wherein the vinyl ether is a hydroxy or alkoxy polyethyleneoxy or polypropyleneoxyvinylether or an analog allyl ether thereof, with up to 10 repeating units, N-vinylacetamide, an N-vinyllactame, N-vinylpyrrolidone, or N-vinylimidazole.

* * * * *

UNITED STATES PATENT AND TRADEMARK OFFICE
CERTIFICATE OF CORRECTION

PATENT NO. : 7,576,039 B2  Page 1 of 1
APPLICATION NO. : 11/316325
DATED : August 18, 2009
INVENTOR(S) : Huber et al.

It is certified that error appears in the above-identified patent and that said Letters Patent is hereby corrected as shown below:

On the <u>Title page of the patent,</u> add an Item under INID Code (30):

-- (30) Foreign Application Priority Data

Jan. 26, 2005   (DE) ..................................... 102005003555.8 --

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,576,039 B2  Page 1 of 1
APPLICATION NO. : 11/316325
DATED : August 18, 2009
INVENTOR(S) : Huber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 908 days.

Signed and Sealed this

Seventh Day of September, 2010

David J. Kappos
*Director of the United States Patent and Trademark Office*